(12) United States Patent
Bardolatzy et al.

(10) Patent No.: US 7,187,884 B2
(45) Date of Patent: Mar. 6, 2007

(54) GRAPHICAL REPRESENTATION OF SETTING VALUES OF PRINTING IMAGE AND MACHINE PARAMETERS FOR AN ELECTROPHOTOGRAPHIC PRINTER OR COPIER

(75) Inventors: Ulrich Bardolatzy, Poing (DE); Nejmi Ölmez, München (DE); Michael Flexeder, Poing (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 10/531,824

(22) PCT Filed: Oct. 28, 2003

(86) PCT No.: PCT/EP03/11960

§ 371 (c)(1),
(2), (4) Date: Oct. 10, 2005

(87) PCT Pub. No.: WO2004/038579

PCT Pub. Date: May 6, 2004

(65) Prior Publication Data

US 2006/0133839 A1 Jun. 22, 2006

(30) Foreign Application Priority Data

Oct. 28, 2002 (DE) .............................. 102 50 182

(51) Int. Cl.
*G03G 15/00* (2006.01)

(52) U.S. Cl. .................. 399/81; 399/138; 715/722; 715/732; 715/833

(58) Field of Classification Search ............... 399/81, 399/138; 715/722, 732, 833
See application file for complete search history.

(56) References Cited

U.S. PATENT DOCUMENTS

| 5,105,220 A | 4/1992 | Knodt et al. |
| 5,444,517 A | 8/1995 | Nagashima |
| 5,467,170 A * | 11/1995 | Wilson et al. ................. 399/81 |
| 6,308,023 B1 * | 10/2001 | Nomura et al. ............... 399/81 |
| 6,329,979 B1 * | 12/2001 | Arimoto et al. ............ 345/173 |
| 6,775,819 B1 * | 8/2004 | Hardikar et al. ............. 717/105 |

FOREIGN PATENT DOCUMENTS

| DE | 43 23 454 | 1/1994 |
| DE | 196 11 645 | 10/1996 |
| DE | 198 36 745 | 2/2000 |
| EP | 1 072 969 | 1/2001 |

\* cited by examiner

*Primary Examiner*—David M. Gray
*Assistant Examiner*—Ruth N. LaBombard
(74) *Attorney, Agent, or Firm*—Schiff Hardin LLP

(57) ABSTRACT

In a method or system for operation of at least one electrophotographic printing or copying system, at least one setting value of a parameter of a printing unit of the printing or copying system is displayed via a graphical user interface with a graphical representation. At least the setting value is input via the user interface.

31 Claims, 4 Drawing Sheets

GRAPHICAL REPRESENTATION OF SETTING VALUES OF PRINTING IMAGE AND MACHINE PARAMETERS FOR AN ELECTROPHOTOGRAPHIC PRINTER OR COPIER

BACKGROUND

The preferred embodiment concerns an operating unit for at least one electrophotographic printing or copying system. The operating unit has a display unit in which is displayed a graphical user interface. The graphical user interface contains a graphical representation of at least one setting value of a first printing unit. The invention also concerns a graphical user interface as well as a method for operation of at least one electrophotographic printing or copying system.

In known printing or copying systems, individual devices (such as printers and various pre- and post-processing units) respectively have (in what is known as a printer or copier path) a control panel whose user interface is directed precisely towards the configuration of the respective device for this device. Furthermore, printing or copying systems are known in which a common control panel is provided for a feeder unit and a printing unit. The control panel was operated with the aid of special software that provides a common user interface for the feeder unit and the printing unit.

Also, printing systems are known in which two separate printers are coupled with one another such that the front side of the paper can be printed with the aid of the first printer and the back side of the paper can be printed with the aid of the second printer. With such coupled printers, instead of printing the front and back side of the paper, i.e. instead of a duplex printing, it is also possible to print a print image in a first color on the front side of the paper with the aid of the first printer and, with the aid of the second printer, to print a print image in a second color over the first print image. Such a two-color printing is also designated as spot color printing. However, printing systems with more than two printers are also known, for example with three or four printers. In these printing systems, the parameters of the respective printer must be set at the operating unit of the respective printer. Given a change of parameters of the paper to be printed, changes must therefore be implemented on all operating units of the printers present in the printing system. Printing systems with two printers are also designated as twin systems and printing systems with three printers are designated as triplex systems.

An operating unit with a touch-sensitive screen is known from the document U.S. Pat. No. 5,105,220 A. With the aid of a display on the operating unit, an operating personnel is shown the operation with the aid of the touch-sensitive screen with the help of the display of a hand that appears on a represented button.

A setup navigation system for programming of reproduction devices is known from the document DE 196 11 645 A1. The reproduction device can be programmed with the aid of a device such that it executes a copy job corresponding to predetermined operating parameters. The programming device contains a user interface that respectively displays individual screens from a plurality of display screens existing on a standard operating function level, a job-related level and a page-related level.

A control panel display method for a copier device is known from the document DE 43 23 454 A1. The control panel contains a touch-sensitive LCD display field; various user interfaces for operation of the copier device can be set with the aid of this display field.

A user interface of an operating unit of a copier with which the blackening degree of generated copies can be set is known from the document U.S. Pat. No. 5,444,517 A.

A printing system with two printers operating in tandem operation is known from the document DE 198 36 745 A1, in which control data can be transferred between an operating unit of the first printer and an operating unit of the second printer. A control unit of the first printer is also connected with one another with a control unit of the second printer via a data line. Changed setting values can be transferred to the respective other control unit with the aid of the data line.

SUMMARY

It is an object to specify an operating unit for at least one electrophotographic printing or copying system via which a simple adjustment of parameters is possible in a simple and clear manner and errors are prevented. A graphical user interface and a method for operation of at least one electrophotographic printing or copying system with at least two printing units is also to be specified.

In a method or system for operation of at least one electrophotographic printing or copying system, at least one setting value of a parameter of a printing unit of the printing or copying system is displayed via a graphical user interface with a graphical representation. At least the setting value is input via the user interface.

DESCRIPTION OF THE PREFERRED EMBODIMENTS

Figure 1:
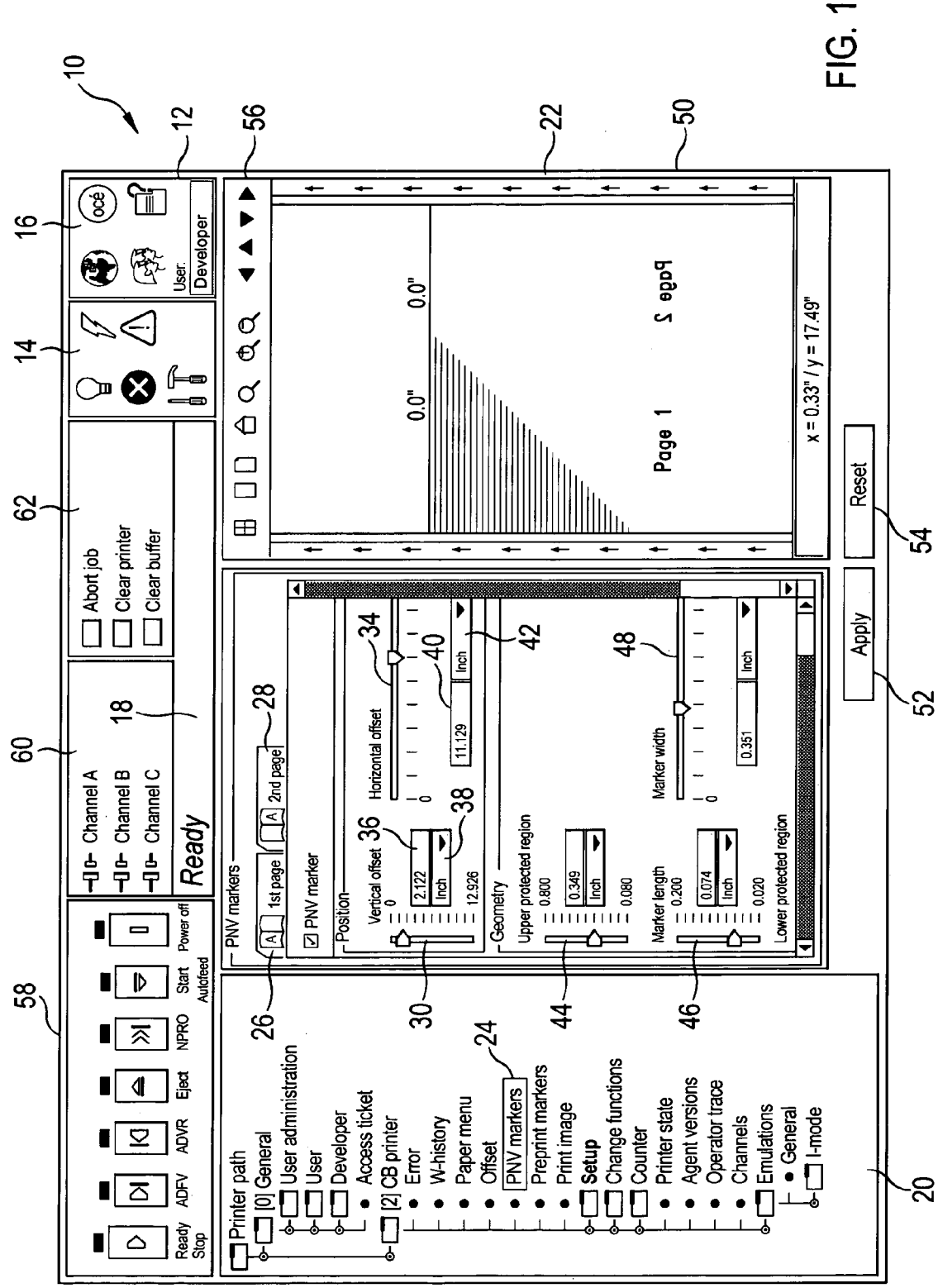
FIG. 1 is a graphical user interface for adjustment of the offset of the print image on the front side relative to the print image on the back side, dependent on a print marker.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur to one skilled in the art to which the invention relates.

Via an operating unit, it is achieved that the setting value is output in a simple manner with the aid of the graphical user interface, whereby an operating personnel is informed about the current amount of the setting value in a clear manner. Furthermore, the operating personnel can input or change the amount of the setting value with the aid of the graphical user interface, whereby a simple handling of the setting values of the printing or copying system is possible.

A second aspect of the preferred embodiment concerns a graphical user interface for operation of an electrophotographic printing or copying system. A graphical representation of at least one setting value of a print image parameter or machine parameter of a printing unit of the printing or copying system occurs with the aid of the graphical user interface. The amount of the setting value can be input with the aid of the user interface.

It is thereby achieved that a simple operation of the printing or copying system is possible with the aid of the graphical user interface. In particular a clear and concise graphical representation of the current amount of the setting value is possible. An operating personnel can also change the current amount in a simple manner with the aid of the graphical user interface.

A third aspect of the preferred embodiment concerns a method for operation of an electrophotographic printing or copying system. At least one setting value of a print image parameter or machine parameter of the printing or copying system is displayed with the aid of a graphic representation via a graphical user interface. The amount of the setting value is input via a user input via the user interface to change the current amount of the setting value.

Via this method it is achieved that the amount of the setting value can be represented in a simple manner and that, to change the setting value, a new amount of the setting value can be input in a simple manner with the aid of the graphical user interface. The operating of the printing or copying system is thereby significantly simplified for an operating personnel.

A fourth aspect of the preferred embodiment concerns an operating unit for at least one electrophotographic printing or copying system. The operating unit comprises a display unit on which is displayed a graphical user interface that comprises a graphical representation of the amount of at least one setting value of a print image parameter or machine parameter of the printing or copying system. The graphical user interface also contains a graphical representation of the amount of the same setting value of a second printing unit of the printing or copying system. At least the amount of the setting value of the first printing unit can be input with the aid of the user interface.

Via such an operating unit of the preferred embodiment, it is achieved that the same setting value of a first printing unit and of a second printing unit can be represented by the same graphical user interface, whereby the adjustment and/or monitoring of setting values of the first printing unit and of the second printing unit can be implemented from a single location. What is known as a single point of operation is thereby present. An operating personnel can thus simply and quickly change and monitor the setting values of a plurality of printing units from this operating unit. Furthermore, the error probability is reduced via the integration of the setting value of the first printing unit and the setting value of the second printing unit into a single graphical user interface. A comparison of the setting value of the first printing unit and the setting value of the second printing unit is possible in a simple manner via the graphical user interface.

A fifth aspect of the preferred embodiment concerns a graphical user interface for operation of an electrophotographic printing or copying system. A graphical representation of the amount of at least one setting value of a print image parameter or machine parameter of a first printing unit of the printing or copying system occurs with the graphical user interface. Furthermore, the graphical representation of the same setting value of a second printing unit of the printing or copying system occurs with the aid of the graphical user interface. At least the amount of the setting value of the first printing unit can be input with the aid of the user interface.

It is thereby achieved that a simple operation of the printing or copying system is possible with the aid of the graphical user interface. Errors in the adjustment of the setting value of the first printing unit can in particular be prevented by the graphical representation of the same setting value of the second printing unit.

A sixth aspect of the preferred embodiment concerns a method for operation of at least one electrophotographic printing or copying system. In this method, at least one setting value of a print image parameter or machine parameter of a first printing unit of the printing or copying system is displayed via a graphical user interface with the aid of a graphical representation. Furthermore, a graphical representation of the same setting value of a second printing unit of the printing or copying system is displayed with the aid of the graphical user interface. At least the setting value of the first printing unit is input via a user input via the user interface.

Via this method it is achieved that the same setting value of the second printing unit can be displayed given an adjustment of the setting value of the first printing unit, whereby the input of the input value is simplified and errors are prevented.

A first graphical user interface 10 is shown in FIG. 1 according to a first exemplary embodiment of the invention. The graphical user interface 10 contains a first section 12 with display fields and graphical function keys, what are known as buttons. The section 12 is also designated as a toolbar.

Graphical function keys and display elements that provide information about the current operating state of the printing system are contained in the region 14 of the toolbar 12. Thus, for example, a display element for display of warnings as well as alarm messages and a second display element for display of malfunctions are contained. In region 16 of the toolbar 12, with the aid of the graphical function keys shown there, a service center of the printing system manufacturer can be contacted, user settings can be effected or provided help instructions can be called up. The region 16 furthermore contains a display field in which is displayed the designation of a current selected and set user. The user "developer" is set in the present exemplary embodiment. The section 12 furthermore contains a field 18 for text output in which the current operating state is output in text form. Thus, after the occurrence of a malfunction state, a message "not ready" is output in the display field 18 and the message "ready" is output in a shown configuration module of the graphical user interface 10.

The graphical user interface 10 contains a menu 20 in which a plurality of user interfaces can be selected with the aid of menu entries that are displayed in a section 22 of the graphical user interface 10 after the selection. The menu 20 is essentially organized according to structural groups and function units of the printing system. The printing system is also designated as a printing path. In the present exemplary embodiment, the menu entry 24 "PNV markers" is selected in the lower menu "CB printer". A control panel to set the position of print markers, what are known as PNV markers, is displayed in the section 22 of graphical user interface 10 via this selection.

Two register cards are provided in the control panel for PNV markers, whereby the register card 26 is associated with the page 1 and the register card 28 is associated with the second print page 2 arranged on the back side of the page 1.

The input and output fields contained on the register cards 26 and 28 essentially coincide. In the control panel shown in FIG. 1 for adjustment of PNV markers, the register card 26 of the page 1 is selected. A selection field 30, what is known as a check box, is provided with whose deactivation (i.e. when no check is displayed in this check box) no PNV marker is generated on the page 1. The vertical position of the PNV marker can be set with the aid of a graphical slide control 32. The setting value can thereby be an adjustment in a range from 0 to 12.926 inches. The value adjusted with the aid of the slide control 32 is output as a number value in the output field 36. The current measurement unit (defaulted to inches) of the number value can be changed with the aid of the selection field 38, for example to the unit millimeters. A number value can also be directly input in the field 36 via a keyboard of an operating unit on which the graphical user interface 10 is displayed. The horizontal position of the PNV marker can be preset with the aid of a graphical slide control 34. The current number value set with the aid of the slide control 32 is output in the input and output field 40 and the measurement unit belonging to this number value is output in the input and output field 42. As in the input and output field 36, a number value can also be directly input into the input and output field 40.

The register card 26 furthermore contains a graphical slide control 44, a graphical slide control 46 and a graphical slide control 48. An upper protected region that establishes a region from the beginning of the page in the vertical direction in which the PNV marker is not generated is established by the graphical slide control 48. The mark length is established with the aid of the slide control 46 and the mark width is established with the aid of the slide control 48. Like the slide control 32, an input and output field for a number value and an input and output field for a measurement unit are respectively associated with the slide controls 44, 46 and 48. An input and output field for a number value set with the aid of the slide control and an input and output field for the measurement unit of the number value are provided for the slide control 48 in the same manner as for the slide control 34.

By changing the measurement unit, the setting ranges of the slide controls 32, 34, 44, 46 and 48 are also changed corresponding to the conversion factor relative to the originally-set measurement unit. The currently displayed number value with which the respective measurement unit is associated is also converted and output corresponding to the conversion factor of the changed measurement unit. Given an input of a number value via a keyboard, the pointer of the slide control 32, 34, 44, 46, 48 associated with the number value is also correspondingly shifted. The position of the PNV marker on the front side and rear side is graphically shown in the region 50 of the section 22. The set values can be applied with the aid of graphical function key 52 and the changed setting values can be reset with the aid of the graphical function key 54. The view of the PNV markers in the region 50 can be set and modified with the aid of the toolbar 52.

The toolbar 12 furthermore contains a region 58 that contains graphical function keys for operation of the printing system. These graphical function keys in the region 58 are also provided in hardware on the printing system. These function keys optically coincide in shape, color and arrangement with the buttons provided on the printing system.

A printing channel of the printing system can be selected in the region 60 of the toolbar 12, whereby a selected and thereby activated channel is optically emphasized or marked in the region 60. Various print jobs can be interrupted by an operating personnel in the region 62, for example after a malfunction.

Figure 2:
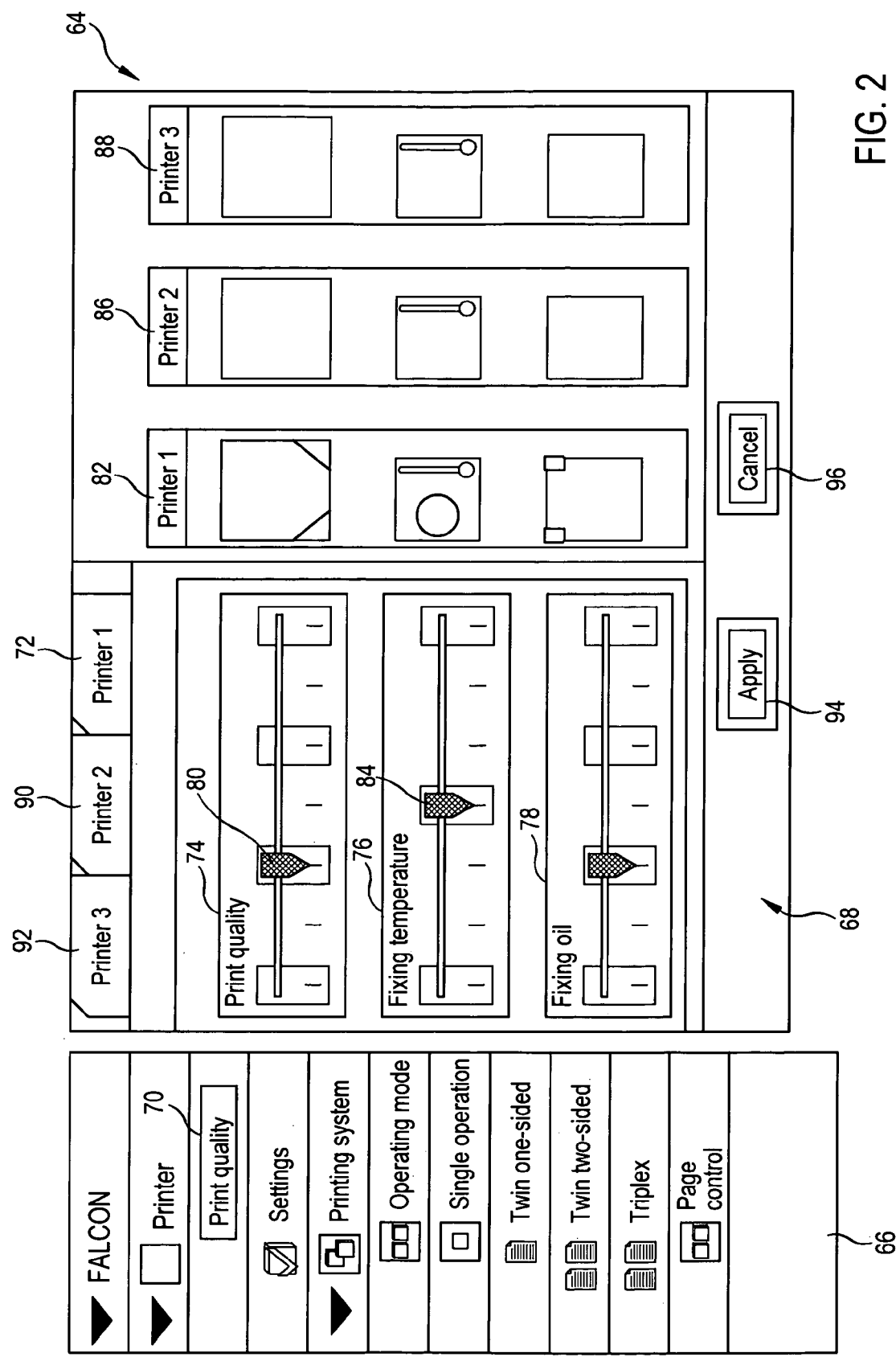
FIG. 2 is a second user interface for adjustment of the print quality of a printing system with three printers.

A graphical user interface 64 is shown in FIG. 2 according to a second exemplary embodiment of the invention. The graphical user interface 64 contains a menu 66 in which a user interface can be selected from a plurality of possible user interfaces. The menu entries 70 are arranged in a tree-like structure and partitioned according to structural units and function groups. A selected user interface is displayed in the window 68 of the graphical user interface 64. The graphical user interface 64 is provided for operation of a printing system with three printers, what is known as a triplex unit. The first printer thereby prints a print image in a first color on the front side of the carrier material; the second printer likewise prints a print image in a second color on the front side of the carrier material, whereby the print images are printed one atop the other and what is known as a spot color print image is generated. The third printer prints a print image in the first color on the back side of the carrier material. Preset setting values for each of the three printers can be re-input and/or changed with the aid of the graphical user interface 64.

In the menu 66, the menu entry 70 has been selected and activated, whereby a user interface for adjustment of the print quality for the printers 1, 2 and 3 is displayed in the section 68 of the graphical user interface 64. This is activated via selection of the register card 72, whereby the slide control 74 for adjustment of the contrast concerns a print image, the slide control 76 for adjustment of the fixing temperature concerns a fixing unit and the slide control 78 for adjustment of the fixing oil quantity concerns the printer 1 selected via the register card 72. By shifting the slider 80 of the slide control 74, the contrast setting (shown with the help of a circle diagram) for printer 1 is changed, dependent on the shifting of the slider 80 of the slide control 74, in the symbolic representation in the display field 82. The graphical display of the fixing temperature in the display field 82 occurs with the aid of a symbolically-indicated thermometer, likewise dependent on the value set with the slider 84 of the slide control 76. A fill level in the measuring capillary is displayed in the symbolic representation of the fixing temperature dependent on the slide position of the slider 84 on the slide control 76.

The setting value of the slide control 78 is likewise graphically displayed in the display field 82 with the aid of a symbolic representation. For this, a series of five drop-shaped display elements are provided in the display field 82. A part or all display elements are filled in with the border color of the display element or are filled with the background color of the display element dependent on the setting value of the slide control 78. The fixing oil quantity that is used to fix a toner image applied to the carrier material is thereby graphically illustrated.

In addition to the display field 82 that concerns the printer 1, a display field 86 and a display field 88 are provided, whereby the display field 86 concerns the settings of the print quality for the printer 2 and the display field 88 concerns the settings for the print quality of the printer 3. The display field 82 is shown in high-contrast and the display fields 86 and 88 are shown in low-contrast via the selection of the register card 72. The display field 82 can thus, for example, be displayed in a color representation and the display fields 86 and 88 can be displayed in a greyscale representation. It is thus clarified that the settings effected with the aid of the slide controls 74, 76 and 78 concern the printer 1. In addition to the register card 72, register cards 90 and 92 are provided, whereby the register card 90 concerns the printer 2 and the register card 92 concerns the printer 3. The register card designation of the selected printer is respectively displayed in a black color and the register card designations of the unselected printer is respectively displayed in a grey color. The designation of the printer selected with the aid of the register card 72, 90, 92 is thereby clearly emphasized. The register cards 72, 90, 92 respectively contain the same slide controls 74, 76, 78 for contrast, fixing temperature and fixing oil.

As already explained above for the display field 82, via selection of the register card 72, 90, 92, the display field 82, 86, 88 associated with the register card 72, 90, 92 or the display field 82, 86, 88 that is associated with the same printer as the register card 72, 90, 92 is displayed in a color representation, whereby both remaining display fields 82, 86, 88 are displayed in a greyscale representation. Via the concise representation of the display fields 82, 86 and 88 arranged next to one another, given adjustment of the print quality parameters contrast, fixing temperature and fixing oil an operating personnel can simply compare the setting values of the corresponding printer 1, 2, 3 with the setting values of the other printer of the printing system. Wrong settings are obvious for an operating personnel via this optical comparison and can thereby be prevented in a simple manner. In other control panels, for example in a control panel for adjustment of the paper parameters, identical setting values are used for all three printers. A differentiation between the individual printers 1, 2 and 3 is not reasonable there since the same carrier material is supplied to all three printing units. Given a change of the supplied carrier material, a setting value thereby only has to be changed once for all three printers.

In another exemplary embodiment, for example, the settings values of the fixing temperature of the printer 1, the printer 2 and the printer 3 are coupled with one another such that, upon an increase of the fixing temperature of the printer 3, the fixing temperatures of the printers 1 and 2 are automatically reduced. It is thus achieved that the carrier material is relatively lightly stressed in the fixing in the first printer and second printer, and, via the relatively high fixing temperature in the printer 3, a qualitatively high-grade and durable fixing of the toner images occurs on the carrier material.

The current modified setting values can be applied with the help of the graphical function key 94 and the current changed setting values can be discarded, and the user interface for adjustment of the print quality can be left with the aid of the function key 96.

The graphical user interface 64 according to FIG. 2 has been optimized for an operation with the aid of a touch-sensitive screen and is suitable for what is known as a finger operation. The adjustment of the sliders 80 and 84 of the slide controls 74, 76, 78 can be changed in steps via contact of the dark background areas. The sliders 80, 84 are also designated as a scale pointer. The selection of the respective register card 72, 90, 92 occurs via contact of the respective register card tab. The selection of the menu entries and the opening of the sub-menus likewise occurs via a finger contact of the respective menu or menu entry.

In a further exemplary embodiment, repeatedly used setting values are stored by the operating unit. The stored setting values are used as scale values and as adjustment positions for partitioning of a scale of the respective graphical slide control 74, 76, 78 or of a circle diagram or rotating control for input of the setting values.

Figure 3:
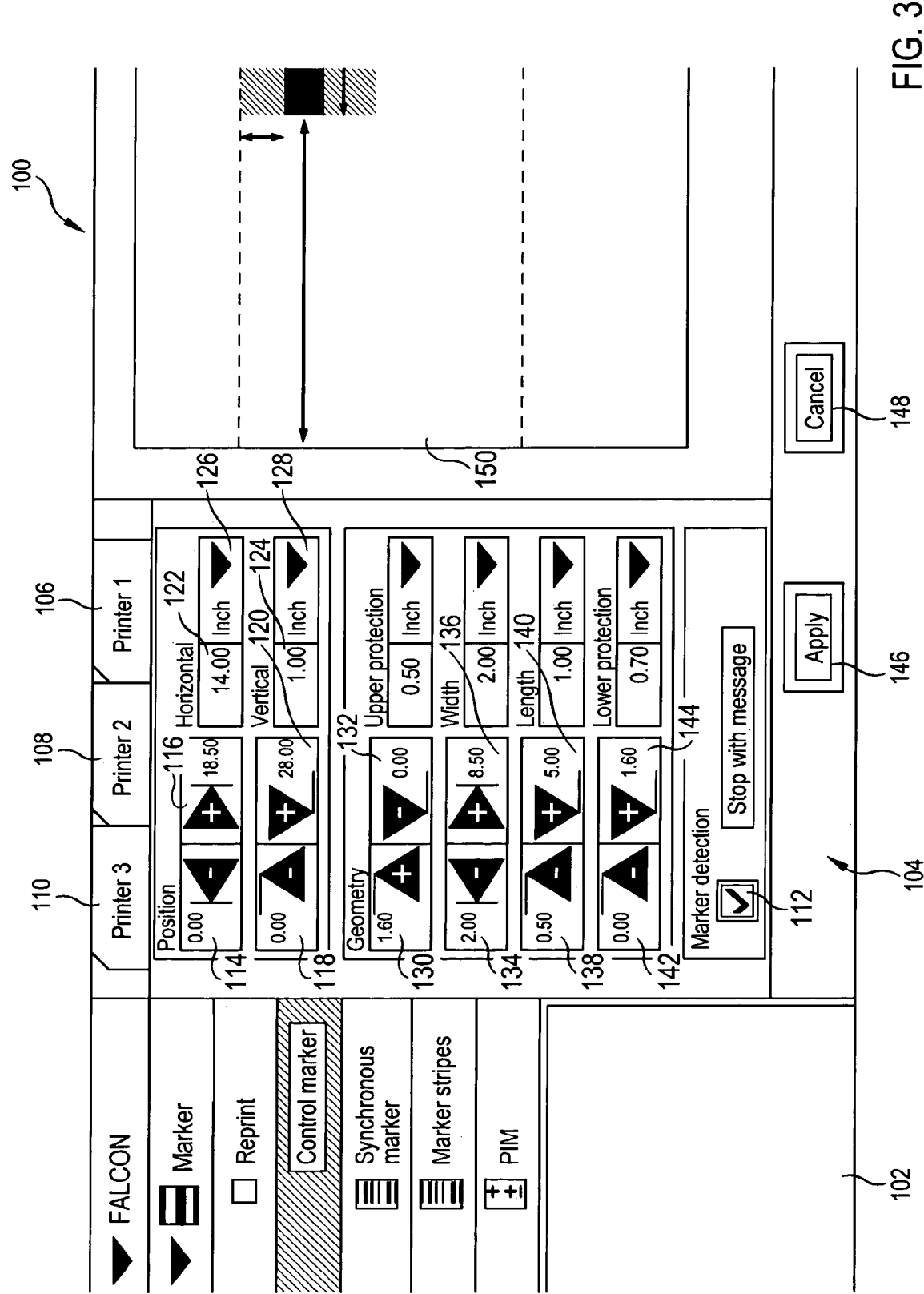
FIG. 3 is a third user interface for adjustment of the position of a control marker.

A graphical user interface 100 similar to the user interface 64 according to FIG. 2 is shown in FIG. 3. The graphical user interface 100 contains a menu 102. The menu entry "control marker" has been activated in the menu 102, whereby a user interface for adjustment of a control marker position is displayed in the section 104 of the graphical user interface 100. A control marker is generated with the aid of the printer 1 and detected by the printer 2 and the printer 3, which then respectively establish the position of a print image to be generated dependent on the position of this control marker. The printer 1, which is arranged before the printer 2 and the printer 3 in the transport direction of the carrier material and thus, as a first of these three printers, generates a print image on the supplied carrier material, generates such a control marker in addition to the actual print image. Since the control marker is only generated by the printer 1, the register card 106 for printer 1 is automatically activated upon selection of the menu entry "control marker".

The register cards 108 and 110 that concern the printers 2 and 3 in other user interfaces (such as, for example, in the user interface for adjustment of the print quality according to FIG. 2) cannot be activated in the user interface for adjustment of the control marker position. Given adjustment of the control marker position for printer 1, a marker detection is respectively, automatically activated in the printer 2 and in the printer 3 when an input field 112 (what is known as a check box) is activated. The horizontal position is changed with the aid of graphical function keys 114 and 116 and the vertical position is changed with the aid of the function keys 118, 120 in preset steps given an activation of these function keys 114, 116. The limit values of the position are contained on the function keys 114, 116.

The current setting value is respectively indicated in input and output fields 122 and 124. The measurement unit associated with the number value output in the input and output field 122 is displayed in the input and output field 126, whereby this measurement unit can be changed with the aid of what is known as a selection menu. Given a change of the measuring unit with the aid of the selection menu, the current number value shown in the input and output field 122 is then converted and displayed dependent on the conversion factor of the original measurement unit relative to the changed measurement unit. A measurement unit for number value output in the input and output field 124 is specified in the input and output field 128 in the same manner as the display and adjustment of the measurement unit with the aid of the input and output field 126. The limit values displayed on the function keys are also converted and displayed dependent on the conversion factor upon changing of the measurement unit.

An upper protection region, the width of the control marker, the length of the control marker and a lower protection region established with further function keys 130 through 144. The currently set number values are displayed in associated input and output fields with which is respectively associated input and output fields for display and modification of the measurement unit.

The graphical user interface 100 furthermore contains a graphical function key 146 for application of the changed setting values, whereby the setting values are then used for control of the printing system. The changed settings values can be discarded and the user interface for adjustment of the control markers can be left with the aid of a further function key 148. Furthermore, the graphical user interface 100 contains a display region 150 in which is graphically shown the position of the control marker on the carrier material, whereby given a change of the setting values the position of the setting marker, or the size of the setting marker is shifted dependent on the effected changes.

Figure 4:
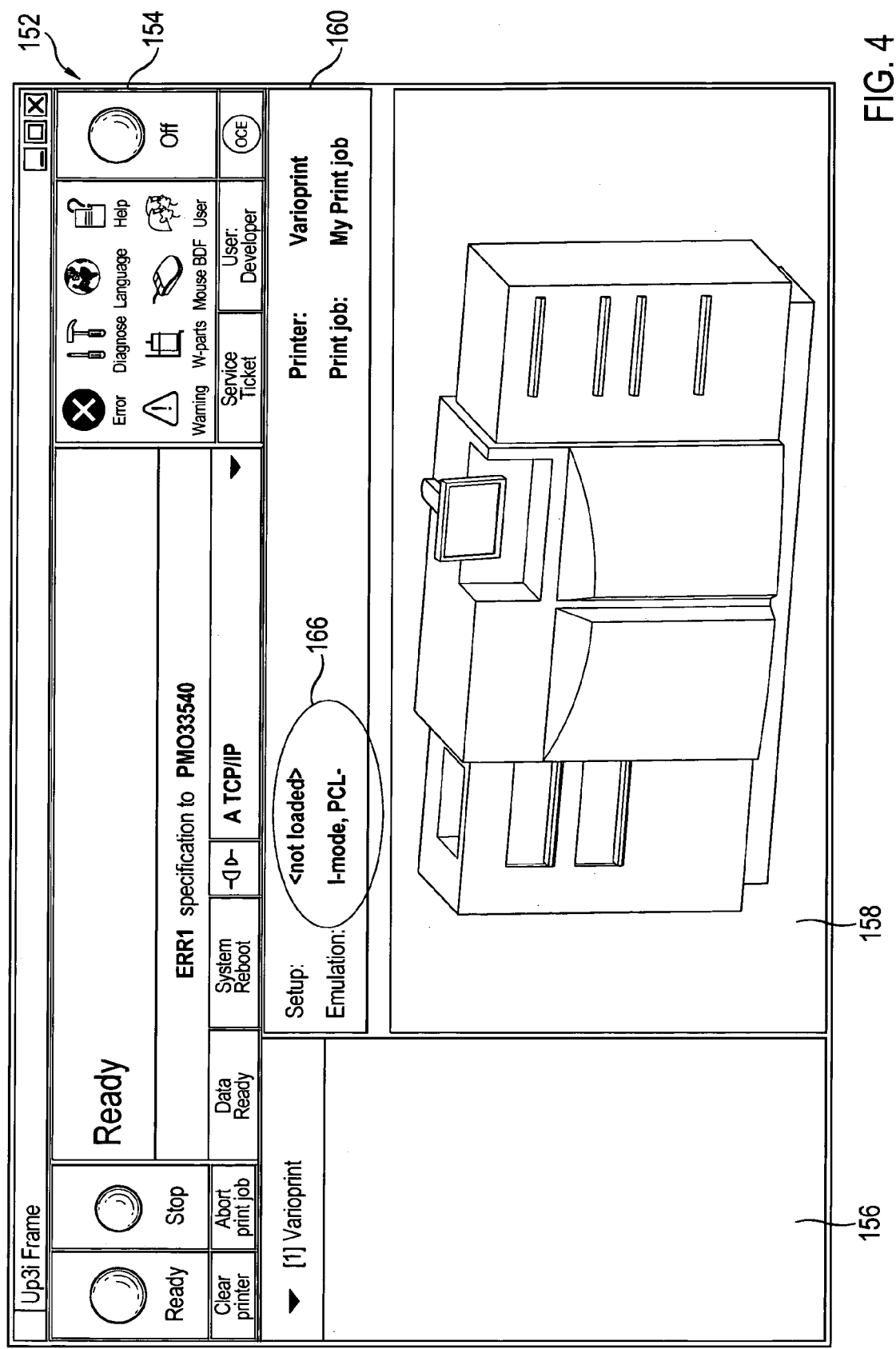
FIG. 4 is a fourth user interface for operation of a printing system.

A graphical user interface 152 is shown in FIG. 4 according to a fourth exemplary embodiment of the invention. This graphical user interface comprises a first section 154 with what is known as a toolbar which contains graphical function keys, what are known as buttons, for control of the printing system. The graphical user interface 152 comprises a menu 156 in which a user interface displayed in a section 158 of the user interface 152 can be selected. Furthermore, the graphical user interface 152 comprises a section 160 in which the input and output of important printing parameters occurs. Thus, for example, the name of the printer and the name of the current print job are output. Furthermore, the text output field 166 contains information about a setup program module and about supported printer languages.

One or two printing units can be alternatively provided in the printer that is operated and controlled with the aid of the user interface according to FIG. 4, whereby the same setting possibilities can then be provided for the two printing units as are described for two printers in connection with FIGS. 1 through 3.

Although preferred exemplary embodiments are shown and described in detail in the drawings and in the preceding specification, these should be viewed as purely exemplary and not as limiting the invention. It is noted that only preferred exemplary embodiments are shown and described, and all variations and modifications that lie within the scope of protection of the invention should be protected.

The invention claimed is:

1. An operating unit for at least one electrophotographic printing or copying system, comprising:
a display unit on which a graphical user interface is displayed that comprises a graphical representation of at least one setting value of a parameter of a printing unit of the printing or copying system;
at least the setting value is input with aid of the user interface; and
a current setting value of a slide control is displayed on a scale of the slide control with aid of a scale pointer, the scale pointer being shiftable with aid of an input device that can be increased and reduced in steps via graphical function keys given a representation of the setting value with aid of figures of an amount of the setting value, and the amount of the setting value output with aid of a circle diagram can be changed by shifting a position of a setting marker arranged on the circle diagram or via an input via graphical function keys.

2. An operating unit according to claim 1 wherein an amount of the setting value can be input and output.

3. An operating unit according to claim 1 wherein the setting value concerns at least one of the elements selected from the group consisting of contrast, brightness, fixing oil quantity, paper parameters, and a print marker position of the printing units.

4. An operating unit according to claim 1 wherein the setting value can be input and output with aid of displayed figures, a graphical slide control, or a circle diagram.

5. An operating unit according to claim 1 wherein the setting value is shown as a bar or symbol graphic, the setting value can be changed via a figure input or via graphical function data, and the bar or symbol graphic is changed dependent on an input value.

6. A method for operation of at least one electrophotographic printing or copying system, comprising the steps of:
displaying at least one setting value of a parameter of a printing unit of the printing or copying system via a graphical user interface with a graphical representation;
inputting at least the setting value via the user interface; and
storing repeatedly-used setting values by an operating unit, said repeatedly-used setting values serving as scale values for partitioning of a scale of a graphical slide control or of a circle diagram.

7. An operating unit for at least one electrophotographic printing or copying system, comprising:
a display unit on which a graphical user interface is displayed that comprises a graphical representation of at least one setting value of a parameter of a printing unit of the printing or copying system;
the graphical user interface comprising a graphical representation of an amount of the same setting value of a second printing unit of the printing or copying system; and
at least an amount of the setting value of the first printing unit is input with aid of the user interfaces.

8. An operating unit according to claim 7 wherein the setting value concerns at least one of the elements selected from the group consisting of contrast, brightness, fixing oil quantity, paper parameters, and a print marker position of the printing units.

9. An operating unit according to claim 7 wherein the graphical representation of the setting value can be input and output with aid of shown figures, with help of a graphical slide control, or with help of a circle diagram.

10. An operating unit according to claim 9 wherein the current setting value of the slide control is displayed on a scale of the slide control with aid of a scale pointer, the scale pointer being shiftable with aid of an input device that can be increased and reduced in steps via graphical function keys given representation of the setting value with aid of figures of the amount of the setting value, and the amount of the setting value output with aid of the circle diagram being changeable by shifting a position of a setting marker arranged on the circle diagram or via an input via graphical function keys.

11. An operating unit according to claim 7 wherein the setting value of the second printing unit is input with aid of the interface.

12. An operating unit according to claim 7 wherein a central operating unit is provided for the first printing unit and the second printing unit.

13. An operating unit according to claim 7 wherein each printing unit has a separate operating unit, the setting value of the first printing unit and the setting value of the second printing unit being respectively displayable and input on the operating unit of the first printing unit and the operating unit of the second printing unit.

14. An operating unit according to claim 7 wherein the setting value is represented as a bar or symbol graphic, the setting value being changeable via a figure input or via graphical function data, and the bar or symbol graphic is changed dependent on an input value.

15. An operating unit according to claim 7 wherein the amount of the setting value of the first printing unit being changeable dependent on the amount of the second printing unit.

16. An operating unit according to claim 15 wherein the setting value concerns at least one of the elements selected from the group consisting of position marker shifting of the respective printing unit, the position of the print image to be generated by the printing unit being established dependent on a position of the position marker on the carrier material.

17. An operating unit according to claim 15 wherein the setting value concerns at least one parameter of a carrier material.

18. An operating unit according to claim 7 wherein given a change of the amount of the setting value of the first printing unit, the amount of the setting value of the second printing unit is changed in a same manner, and the amount of the setting value of the first printing unit is correspondingly changed given a change of the amount of the setting value of the second printing unit.

19. An operating unit according to claim 7 wherein the first printing unit and the second printing unit are separate structural units.

20. An operating unit according to claim 7 wherein the first printing unit and the second printing unit are coupled with one another such that the first printing unit generates a print image on a front side of a carrier material and the second printing unit generates a print image on a back side of the carrier material, or the first printing unit generates a print image on the front side of the carrier material and the second printing unit generates a second print image on the front side of the carrier material.

21. An operating unit according to claim 20 wherein the carrier material is a continuous carrier material.

22. An operating unit according to claim 7 wherein a type or color of toner material with which the first printing unit generates a print image are different from a type or color of toner material with which the second printing unit generates a print image.

23. An operating unit according to claim 7 wherein the graphical user interface furthermore comprises a graphical representation of a same setting value of a third printing unit.

24. operating unit according to claim 7 wherein the graphical user interface comprises a display element that signals a presence of print data still to be processed.

25. An operating unit according to claim 24 wherein the display element comprises a colored display field or a text output.

26. An operating unit according to claim 25 wherein the display field contains a graphical symbol.

27. An operating unit according to claim 25 wherein the display field is arranged in a toolbar of the graphical user interface, the display field being colored in a low-control first color in a first operating state and, in a second operating state, is colored in a color significantly high-contrast relative to surroundings of the display field.

28. An operating unit according to claim 7 wherein a display element is provided that displays at least one active print channel of the printer.

29. A graphical user interface for operation of an electrophotographic printing or copying system, comprising:
   a graphical representation of at least one setting value of a parameter of a first printing unit of the printing or copying system;
   a graphical representation of the same setting value of a second printing unit of the printing or copying system; and
   at least an amount of the setting value of the first printing unit being input with aid of the user interface.

30. A method for operation of at least one electrophotographic printing or copying system, comprising the steps of:
   displaying at least one setting value of a parameter of a first printing unit of the printing or copying system via a graphical user interface with a graphical representation;
   displaying a graphical representation of the same setting value of a second printing unit of the printing or copying system with aid of the graphical user interface; and
   inputting at least the setting value of the first printing unit via a user input via the user interface.

31. A method according to claim 30 wherein repeatedly-used setting values are stored by the operating unit, these repeatedly-used setting values serving as scale values for division of a scale of a graphical slide control or of a circle diagram.

* * * * *